United States Patent
Stewart et al.

(10) Patent No.: US 7,074,256 B2
(45) Date of Patent: Jul. 11, 2006

(54) PHOSPHAZENE MEMBRANES FOR GAS SEPARATIONS

(75) Inventors: Frederick F. Stewart, Idaho Falls, ID (US); Mason K. Harrup, Idaho Falls, ID (US); Christopher J. Orme, Shelley, ID (US); Thomas A. Luther, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 10/846,195

(22) Filed: May 13, 2004

(65) Prior Publication Data

US 2006/0016331 A1    Jan. 26, 2006

(51) Int. Cl.
*B01D 53/22* (2006.01)
*B01D 71/06* (2006.01)

(52) U.S. Cl. .................. 95/49; 95/45; 95/51; 96/13; 96/14; 210/500.28

(58) Field of Classification Search .............. 95/45, 95/49, 51; 96/4, 11–14; 210/500.27, 500.28
See application file for complete search history.

(56) References Cited

U.S. PATENT DOCUMENTS

| | | | |
|---|---|---|---|
| 4,710,204 A | 12/1987 | Kraus et al. | |
| 4,728,345 A | 3/1988 | Murphy | |
| 4,749,489 A * | 6/1988 | Allen et al. | 210/500.28 |
| 4,783,202 A | 11/1988 | Kraus et al. | |
| 4,840,856 A * | 6/1989 | Nakacho et al. | 429/315 |
| 5,022,996 A * | 6/1991 | McCaffrey et al. | 210/654 |
| 5,066,398 A * | 11/1991 | Soria et al. | 210/321.89 |
| 5,098,574 A * | 3/1992 | Chambrette et al. | 210/651 |
| 5,174,923 A * | 12/1992 | Chen et al. | 252/500 |
| 5,238,569 A * | 8/1993 | Soria et al. | 210/500.27 |
| 5,252,212 A * | 10/1993 | McHugh et al. | 210/490 |
| 5,266,207 A * | 11/1993 | Boye et al. | 210/653 |
| 5,487,390 A * | 1/1996 | Cohen et al. | 600/458 |
| 5,548,060 A * | 8/1996 | Allcock et al. | 528/487 |
| 5,562,909 A * | 10/1996 | Allcock et al. | 424/280.1 |
| 5,898,062 A * | 4/1999 | Allcock et al. | 528/168 |
| 6,093,325 A * | 7/2000 | Stone | 210/654 |
| 6,337,018 B1 * | 1/2002 | Mickols | 210/500.38 |
| 6,365,294 B1 * | 4/2002 | Pintauro et al. | 429/33 |
| 6,403,755 B1 | 6/2002 | Stewart et al. | |
| 6,602,418 B1 | 8/2003 | Peterson et al. | |
| 2002/0088748 A1 * | 7/2002 | Allcock et al. | 210/500.21 |
| 2002/0144947 A1 * | 10/2002 | Peterson et al. | 210/650 |
| 2004/0033406 A1 * | 2/2004 | Andrianov et al. | 429/33 |

FOREIGN PATENT DOCUMENTS

GB     2139237 A  * 11/1984

OTHER PUBLICATIONS

Baker et al., "Membrane Separation Systems: Recent Developments and Future Directions," Noyes Data Corporation, Park Ridge, NJ, pp. 136-145, 150 (1991).
Orme et al., "Characterization of gas transport in selected rubbery amorphous polyphosphazene membranes," J. Memb. Sci. 186:249-256 (2001).
Singler et al., "Synthesis and Characterization of Polyaryloxyphosphazenes," J. Poly. Sci. Polymer Chem. Ed., 12:433-444 (1974).

* cited by examiner

Primary Examiner—Robert H. Spitzer
(74) Attorney, Agent, or Firm—TraskBritt, P.C.

(57) ABSTRACT

A polyphosphazene having a glass transition temperature ("$T_g$") of approximately −20° C. or less. The polyphosphazene has at least one pendant group attached to a backbone of the polyphosphazene, wherein the pendant group has no halogen atoms. In addition, no aromatic groups are attached to an oxygen atom that is bound to a phosphorus atom of the backbone. The polyphosphazene may have a $T_g$ ranging from approximately −100° C. to approximately −20° C. The polyphosphazene may be selected from the group consisting of poly[bis-3-phenyl-1-propoxy)phosphazene], poly[bis-(2-phenyl-1-ethoxy)phosphazene], poly[bis-(dodecanoxypolyethoxy)-phosphazene], and poly[bis-(2-(2-(2-ω-undecylenyloxyethoxy)ethoxy)ethoxy)phosphazene]. The polyphosphazene may be used in a separation membrane to selectively separate individual gases from a gas mixture, such as to separate polar gases from nonpolar gases in the gas mixture.

19 Claims, 1 Drawing Sheet

US 7,074,256 B2

PHOSPHAZENE MEMBRANES FOR GAS SEPARATIONS

GOVERNMENT RIGHTS

The United States Government has certain rights in this invention pursuant to Contract No. DE-AC07-99ID 13727, and Contract No. DE-AC07-05ID14517 between the United States Department of Energy and Battelle Energy Alliance, LLC.

FIELD OF THE INVENTION

The present invention relates to separating gaseous components of a gas mixture utilizing a separation membrane. More specifically, the present invention relates to separating polar gases from the gas mixture utilizing a separation membrane formed from a polyphosphazene having a low glass transition temperature ("$T_g$").

BACKGROUND OF THE INVENTION

In recent years, separation membranes have been used in many applications, including producing potable water from sea water by reverse osmosis, cleaning industrial effluents, recovering valuable constituents of solutions by electrolysis, and effecting various medical purposes. Membranes have also been used to separate, remove, purify, or partially recover individual components of gas mixtures, such as mixtures of hydrogen, helium, oxygen, nitrogen, argon, carbon monoxide, carbon dioxide ("$CO_2$"), ammonia, water vapor, methane ("$CH_4$"), and other light hydrocarbons. For instance, the separation membranes are used in the production of oxygen-enriched air, production of nitrogen from air, separation of carbon dioxide from methane, hydrogen recovery from various gas mixtures, and removal of organic vapors from air or nitrogen. Gases in the gas mixture permeate at different rates through the separation membrane depending on solubility and diffusivity of the gases in the material used in the membrane.

In order to selectively separate a desired gas from the gas mixture, the separation membrane must be capable of withstanding the conditions to which it is exposed during the separation. For instance, the membrane must be compatible with the gas mixture as well as be stable to the temperatures and pressures used in the separation. To be commercially viable, the membrane must also provide an adequately selective separation for the desired gas at a sufficiently high flux or permeation rate of the permeate gas per unit surface area. This flux is typically expressed as a quantity called the permeability (P), which is a pressure- and thickness-normalized flux of the gas. The rate of permeation of the gas, i.e. flux, through the membrane is related to the permeability constant, but is also influenced by variables, such as partial pressure differential of the permeate gas across the membrane and the temperature. Effective separation of the gas mixture into its components is achieved by a separation membrane that permits a faster permeation rate for one gas (i.e., higher permeability) over that of another gas. The efficiency of the membrane in enriching one gas over another gas is expressed as a quantity called selectivity. As used herein, the term "selectivity" is defined as the ratio of the permeabilities of the gases across the membrane (i.e., $P_A/P_B$, where A and B are the two gases to be separated). The membrane's permeability and selectivity are material properties of the membrane itself and, therefore, these properties are ideally constant with feed pressure, flow rate and other process conditions. However, permeability and selectivity are both temperature-dependent.

Membranes have typically been formed from organic polymeric materials, such as polyimides, polysulfones, polycarbonates, cellulosic polymers, polyethers, polyamides, polyarylates, and polypyrrolones. At a temperature below the $T_g$ of the polymer, the polymer is a glassy solid while at a temperature above the $T_g$, the polymer changes phase into a rubber. Transport properties of the polymer, such as its permeability and selectivity to gases, vary drastically depending on whether the polymer is in the glassy solid phase or the rubber phase. The permeability of gases through many rubbers is high compared to the permeability of the gases through many glassy polymers. However, the selectivity of the rubbery polymers is reduced compared to that of many glassy polymers. Moreover, organic polymers have limited thermal stability at a temperature of greater than 150° C. and do not provide the necessary degree of selectivity between gases.

Polyphosphazenes or phosphazene polymers have also been used in gas separations. As used herein, the term "polyphosphazene" refers to a polymer having an inorganic backbone that consists of alternating phosphorus and nitrogen atoms with alternating double and single bonds. Each phosphorus atom has two additional bonding sites to which functional groups, such as hydroxyl, primary amine, secondary amine, or mercapto groups, are attached. Additionally, alkyl groups are linked to the phosphorus atom by oxygen or nitrogen atoms or benzene or substituted benzene rings are linked to the phosphorus by oxygen atoms. Soluble and hydrolytically stable phosphazenes have a variety of uses, including as membranes to remove water from aqueous solutions, for organic separations, and as flame retardants, ionic conductors, high performance fluids, microencapsulant membranes, and solid polymer electrolytes.

Linear, cyclolinear, and cyclomatrix polyphosphazenes having a wide variety of functional groups attached to the phosphorus atoms are known in the art. Polyphosphazenes have been used to dewater ion-containing solutions, as disclosed in U.S. Pat. No. 6,602,418 to Peterson et al., assigned to the assignee of the present invention.

Separation membranes having a polyphosphazene coating on a porous separation membrane are disclosed in U.S. Pat. No. 4,728,345 to Murphy ("Murphy"). The polyphosphazene coating includes a halogenated homopolymer or copolymer of a phosphazene having functional groups attached to the phosphorus atom through an oxygen, nitrogen, or sulfur atom. The polyphosphazene has a $T_g$ below room temperature. The halogenated polyphosphazenes are disclosed to have increased permeability for $CO_2$ and a high $CO_2/CH_4$ separation factor.

In U.S. Pat. No. 4,783,202 to Kraus et al., polyphosphazene membranes having halogenated sidegroups are disclosed for preferentially separating polar fluids from nonpolar fluids. The phosphazene membrane is used to separate $CO_2$ and hydrogen sulfide ("$H_2S$") from a gas stream that includes $CO_2$, $H_2S$, and $CH_4$. U.S. Pat. No. 4,710,204 to Kraus et al. discloses using a halogenated polyphosphazene to separate acid gases from non-acid fluids. The halogenated phosphazene, such as a poly(fluoroalkoxy)polyphosphazene, is used to separate $CO_2$ and $H_2S$ from a methane feedstream that includes $CO_2$, $H_2S$, and $CH_4$.

In Orme et al., "Characterization of gas transport in selected rubbery amorphous polyphosphazene membranes" J. Memb. Sci. 186:249–256 (2001), phosphazene heteropolymers having three, different pendant groups attached to the phosphorus atoms are disclosed. The pendant groups included 2-(2-methoxyethoxy)ethanol ("MEE"), 4-methoxyphenol, and 2-allylphenyl. The phosphazene heteropolymer was permeable to $CO_2$ and the permeability was observed to be proportional to the percentage of MEE, which includes polyether functionalities. The linear relationship between the $CO_2$ permeability and the percentage of MEE indicated that $CO_2$ had a strong intermolecular interaction with the phosphazene heteropolymer and, specifically, with the MEE pendant group. The polyether functionalities in the MEE pendant groups were thought to interact with the $CO_2$ and increase solubility, increasing membrane effectiveness.

It has been found that membrane materials that exhibit a high selectivity for a given gas pair do not allow the faster, more permeable, gas to permeate at an adequate rate. Conversely, membrane materials with a high permeability for a given gas pair are only moderately selective. Furthermore, a separation membrane that exhibits a high selective separation but an undesirably low flux may require such a large membrane surface area that the use of the membrane is not economically feasible. Similarly, a membrane that exhibits a high flux but a low selective separation is also commercially unattractive. Therefore, it is desired to develop a membrane material that provides a high selectivity for a desired gaseous component while maintaining a high permeability (productivity) for the desired component.

BRIEF SUMMARY OF THE INVENTION

The present invention relates to a polyphosphazene having a glass transition temperature, or $T_g$, of approximately −20° C. or less. The polyphosphazene has at least one pendant group attached to a backbone of the polyphosphazene, the at least one pendant group having no halogen atoms. The polyphosphazene also has no aromatic groups attached to an oxygen atom that is bound to a phosphorus atom of the backbone. The polyphosphazene may have a $T_g$ ranging from approximately −100° C. to approximately −20° C. The polyphosphazene may be selected from the group consisting of poly[bis-3-phenyl-1-propoxy)phosphazene], poly[bis-(2-phenyl-1-ethoxy)-phosphazene], poly[bis-(dodecanoxypolyethoxy)phosphazene], and poly[bis-(2-(2-(2-ω-undecylenyloxyethoxy)ethoxy)ethoxy)phosphazene].

The present invention also relates to a separation membrane that includes a support and a polyphosphazene coating in contact with the support. The polyphosphazene coating includes a polyphosphazene having a $T_g$ of approximately −20° C. or less. The polyphosphazene has no halogen atoms and no aromatic groups attached to an oxygen atom that is bound to a phosphorus atom of a backbone of the polyphosphazene. The polyphosphazene may have a $T_g$ ranging from approximately −100° C. to approximately −20° C. The polyphosphazene may be selected from the group consisting of poly[bis-3-phenyl-1-propoxy)phosphazene], poly[bis-(2-phenyl-1-ethoxy)-phosphazene], poly[bis-(dodecanoxypolyethoxy)phosphazene], and poly[bis-(2-(2-(2-ω-undecylenyloxyethoxy)ethoxy)ethoxy)phosphazene]. The support may be a material selected from the group consisting of cellulose, cellulose acetate, a polyamide, a polyacrylonitrile, a polysulfone, a polyethersulfone, an aromatic polyimide, a polycarbonate, a polyestercarbonate, a polyester, a polyetherketone, a polyolefin, a polytetrafluoroethylene, a polyvinylidenefluoride, a polybenzoazole, and a ceramic material. The polyphosphazene coating may range in thickness from approximately 50 µm to approximately 200 µm.

The separation membrane may be used in a membrane separation system having a housing in which the separation membrane is contained.

The present invention also relates to a method of separating a gas from a gas mixture. The method includes contacting a separation membrane with a gas mixture having at least one polar gas and at least one nonpolar gas. The separation membrane includes a polyphosphazene coating in contact with a support, wherein the polyphosphazene coating has a polyphosphazene having a $T_g$ of approximately −20° C. or less. The polyphosphazene has no halogen atoms and no aromatic groups attached to an oxygen atom that is bound to a phosphorus atom of a backbone of the polyphosphazene. The polyphosphazene may have a $T_g$ ranging from approximately −100° C. to approximately −20° C. The polyphosphazene may be selected from the group consisting of poly[bis-3-phenyl-1-propoxy)phosphazene], poly[bis-(2-phenyl-1-ethoxy)phosphazene], poly[bis-(dodecanoxypolyethoxy)phosphazene], and poly[bis-(2-(2-(2-ω-undecylenyloxyethoxy)-ethoxy)ethoxy)phosphazene].

The gas mixture may include at least one gas selected from the group consisting of hydrogen, helium, oxygen, nitrogen, argon, carbon monoxide, carbon dioxide, water vapor, ammonia, hydrogen sulfide, nitrogen oxides, sulfur oxides, and light hydrocarbons. In one embodiment, the gas mixture may include carbon dioxide, hydrogen sulfide, and methane. The separation membrane may be used to separate the polar gas from the gas mixture, such as separating at least one of carbon dioxide or hydrogen sulfide from the gas mixture.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE INVENTION

Figure 1:
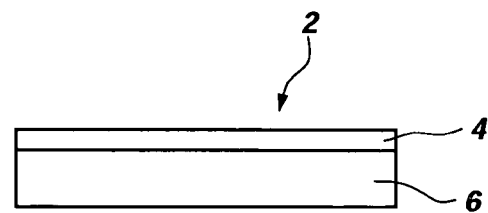
FIG. 1 is a schematic illustration of a separation membrane of the present invention.

A polyphosphazene having a low $T_g$ is disclosed. The polyphosphazene includes no halogen atoms in pendant groups attached to a backbone of the polyphosphazene. As used herein, the term "backbone" refers to alternating phosphorus and nitrogen atoms of the polyphosphazene having alternating double and single bonds. In addition, no aromatic groups are attached to a phosphorus-bound oxygen in the polyphosphazene. The polyphosphazene may be used in a separation membrane to selectively separate at least one gas from a gas mixture. The polyphosphazene provides improved permeability to the separation membrane without decreasing its selectivity. The polyphosphazene has a low $T_g$, such as a $T_g$ of approximately −20° C. or less. For instance, the $T_g$ of the polyphosphazene may range from approximately −100° C. to approximately −20° C.

The polyphosphazene may be a homopolymer or a heteropolymer. As used herein, the term "homopolymer" refers to a polymer formed from identical monomer units and the term "heteropolymer" refers to a polymer formed from different monomer units. In one embodiment of the present invention, the polyphosphazene is a homopolymer. The monomer unit may have at least one type of pendant group attached to its backbone. The pendant group may be an alkyl group, a branched alkyl group, an aromatic-substituted alkyl group, or an alkyl-substituted polyether that is attached to the phosphorus atom through an oxygen atom. However, the pendant group includes no halogen atoms, such as fluorine atoms. In addition, no aromatic groups are attached to the phosphorus-bound oxygen of the polyphosphazene. In other words, the aromatic groups are not directly attached to the phosphorus-bound oxygen. While aromatic groups may be present in the polyphosphazene, the aromatic groups are a terminal group to an alkyl group or a polyether chain. The polyphosphazene may have the following general structure:

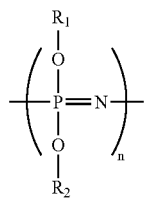

where $R_1$ and $R_2$ are independently selected from an alkyl group, a branched alkyl group, an aromatic-substituted alkyl group, or an alkyl-substituted polyether group and n is an integer ranging from approximately 100 to approximately 70,000. In one embodiment, the polyphosphazene has a molecular weight of greater than approximately 1 million. The aromatic-substituted alkyl group may be a linear or branched alkyl group having an aromatic or substituted aromatic group at its terminus. The alkyl portion of the aromatic-substituted alkyl group may be a methyl, ethyl, propyl, or butyl group. The aromatic-substituted alkyl group may include, but is not limited to, a benzyl, 2-phenyl-propyl, 2-phenyl-ethyl, 3-phenyl-propyl, 4-phenyl-propyl, 4-phenyl-butyl, and 2-(4-methylphenyl)propyl group. The aromatic group may be a phenyl group or a substituted phenyl group that includes, but is not limited to, a 2-tolyl, 3-tolyl, 4-tolyl, ethylphenyl, propylphenyl, n-butylphenyl, i-butylphenyl, and t-butylphenyl group. The alkyl-substituted polyether group may be a terminal, long chain aliphatic group having the structure:

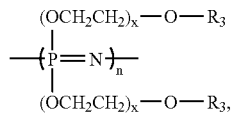

where x is an integer ranging from 1 to 13 and $R_3$ is a linear or branched alkyl group having from 3 carbons to 18 carbons. The long chain aliphatic group may be saturated or may include at least one site of unsaturation or double bond. For instance, the alkyl-substituted polyether group may be a mono alkyl glycol group having linear and branched alkyl groups. Examples of the alkyl-substituted polyether group include, but are not limited to, 2-(2-butoxyethoxy)ethanol, 2-(2-propoxyethoxy)ethanol, 2-(2-dodecanoxyethoxy)ethanol, 2-(2-(2-dodecanoxyethoxy)ethoxy)-ethoxy)ethanol, and 2-(2-tert-butoxyethoxy)ethanol. The alkyl portion of the alkyl-substituted polyether may also include double bonds, such as in 2-(2-(2-co-undecylenyloxyethoxy)ethoxy)-ethanol and 2-(2-ω-octenyloxyethoxy)ethanol.

Depending on whether the polyphosphazene is a heteropolymer or a homopolymer, the pendant groups used as the $R_1$ and $R_2$ may be the same or different pendant groups. Alternatively, the pendant group may be attached to the phosphorus atom through a nitrogen atom or a sulfur atom. The pendant group may also be directly attached to the phosphorus atom. For sake of example only, the polyphosphazene may be poly[bis-3-phenyl-1-propoxy)phosphazene], poly[bis-(2-phenyl-1-ethoxy)phosphazene], poly[bis-(dodecanoxypolyethoxy)-phosphazene], or poly[bis-(2-(2-(2-ω-undecylenyloxyethoxy)ethoxy)ethoxy) phosphazene], which have the following structures, respectively:

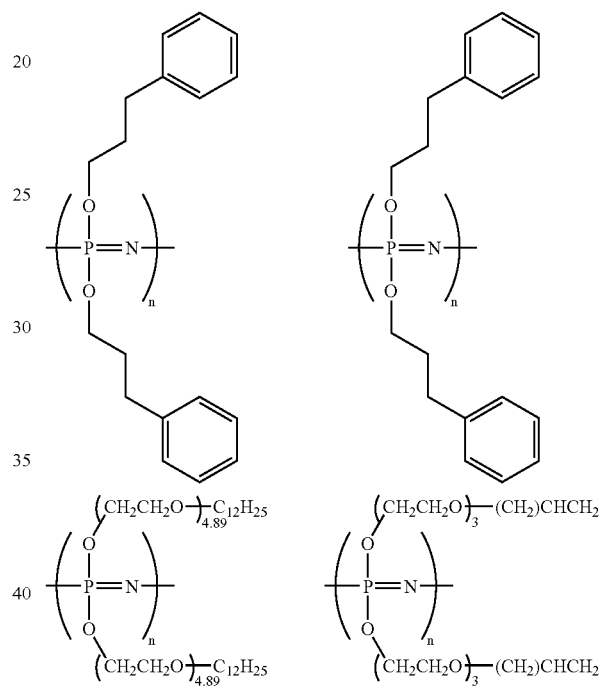

The polyphosphazene may be chemically stable and, as such, is resistant to highly acidic environments. For instance, the polyphosphazene may be stable to aqueous nitric acid and hydriodic acid. Stability may be provided to the polyphosphazene in basic environments by crosslinking the polyphosphazene. To crosslink the polyphosphazene, a free radical initiator may be used in combination with heat, ultraviolet irradiation, or electron beam irradiation to bond polymer chains to one another. The polyphosphazene may also be thermally stable to a temperature of up to approximately 300° C. In contrast, conventional organic polymers are significantly less thermally stable.

The polyphosphazene may be synthesized by conventional techniques, such as by a nucleophilic substitution reaction with poly[bis-chlorophosphazene]. The poly[bis-chloro-phosphazene] may be synthesized by a ring opening polymerization of hexachlorocyclotri-phosphazene, which is commercially available. The pendant group of the polyphosphazene may be attached to the phosphorus atom by a nucleophilic substitution process between poly[bis-chlorophosphazene] and an organic nucleophile. If the polyphosphazene is a homopolymer and contains one type of pendant group, the synthesis may be simpler and, thus, less costly than the synthesis of other polyphosphazenes.

As previously mentioned, the polyphosphazene may be used in a separation membrane. The separation membrane 2 may include a layer or coating of the phosphazene 4 on a support 6 or substrate, as shown in FIG. 1. The polyphosphazene 4 may include one polyphosphazene or a mixture of phosphazenes. In one embodiment, the polyphosphazene 4 is poly[bis-3-phenyl-1-propoxy)phosphazene], poly[bis-(2-phenyl-1-ethoxy)phosphazene], poly[bis-(dodecanoxypolyethoxy)phosphazene], poly[bis-(2-(2-(2-ω-undecylenyloxyethoxy)ethoxy)phosphazene], or mixtures thereof. A solution of the polyphosphazene 4 may be prepared and then cast onto the support 6. For the sake of example only, the support 6 may be dipped into the polyphosphazene solution, the polyphosphazene solution may be spray cast onto the support 6, or a thin layer of the polyphosphazene 4 may be extruded onto the support 6. Alternatively, a small aliquot of the polyphosphazene solution may be applied to the support 6 and the support 6 rotated at high speed to spread the polyphosphazene 4 over the support surface.

The polyphosphazene solution may include from approximately 0.5% by weight to approximately 15% by weight of the polyphosphazene dissolved in an organic solvent, such as tetrahydrofuran ("THF"), methanol, acetone, ethyl acetate, methylethylketone, dimethylformamide, dimethylacetamide, formyl piperidine, or N-methylpyrrolidone. The polyphosphazene solution may also include a free radical initiator, such as 1,1'-azo-bis(cyclohexanecarbonitrile) or benzoyl peroxide. A sufficient amount of the polyphosphazene solution may be applied to the support 6 to form a layer having a thickness ranging from approximately 50 μm to approximately 200 μm upon evaporation of the organic solvent. Alternatively, the polyphosphazene coating may be applied to the support 6 in multiple coating steps. The polyphosphazene 4 may also be formed into flat sheets, films, tubes or hollow fibers. Before use, the separation membrane 2 may be cured to crosslink the polyphosphazene 4.

The support 6 may be a porous material that provides mechanical durability to the polyphosphazene 4, such as an organic material or an inorganic material. Organic materials that may be used include, but are not limited to, cellulose, cellulose acetate, polyamides, polyacrylonitrile, polysulfone, polyethersulfone, aromatic polyimide, polycarbonate, polyestercarbonate, polyester, polyetherketone, polyolefin, polytetrafluoroethylene, polyvinylidenefluoride ("PVDF"), or polybenzoazole materials. Inorganic materials include, but are not limited to, a ceramic or a metal. Examples of supports 6 that may be used include, but are not limited to, 25 mm Whatman Anopore™ ceramic membranes having a 0.02 μm pore size, Goretex®, or PVDF.

The separation membrane 2 may be used to separate at least one gas from the gas mixture. The gas mixture may include, but is not limited to, at least one of the following gases: hydrogen, helium, oxygen, nitrogen, argon, carbon monoxide, $CO_2$, water vapor, ammonia, $H_2S$, nitrogen oxides, sulfur oxides, or light hydrocarbons. As used herein, the term "light hydrocarbon" refers to a gaseous, saturated or unsaturated $C_{1-5}$ hydrocarbon including, but not limited to, $CH_4$, ethane, ethene, ethyne, propane, propene, propyne, propadiene, n-butane, 2-methylpropane, 2-butene, 1-butene, 2-butyne, 1-butyne, 1,3-butadiene, 1,2-butadiene, n-pentane, cyclopentane, 2-methyl-2-butene, 3-methyl-1-butene, 2-methyl-1-butene, 2-pentene, 1-pentene, 2-methyl-1,3-butadiene, 3-methyl-1,2-butadiene, 2,3-pentadiene, 1,4-pentadiene, 1,3-pentadiene, 1,2-pentadiene, 3-methyl-1-butyne, 2-pentyne, 1-pentyne, and 2-methylpropane.

For instance, the separation membrane 2 may be used to selectively separate at least one polar gas from a gas mixture that includes at least one polar gas and at least one nonpolar gas. As such, gas transport properties and separation properties of the polyphosphazene 4 may be highly selective and highly permeable for the polar gas that is to be removed. In one embodiment, the gas mixture includes $CO_2$, $H_2S$, and $CH_4$. The polar gas to be separated from the gas mixture is $CO_2$ or $H_2S$ and the nonpolar gas is $CH_4$. As such, the polyphosphazene 4 of the present invention may be used in natural gas upgrading to remove at least one of $CO_2$ or $H_2S$ from $CH_4$. In natural gas upgrading, one component of the gas mixture, such as $CH_4$, is concentrated by separating the other components, such as $CO_2$ or $H_2S$.

Figure 2:
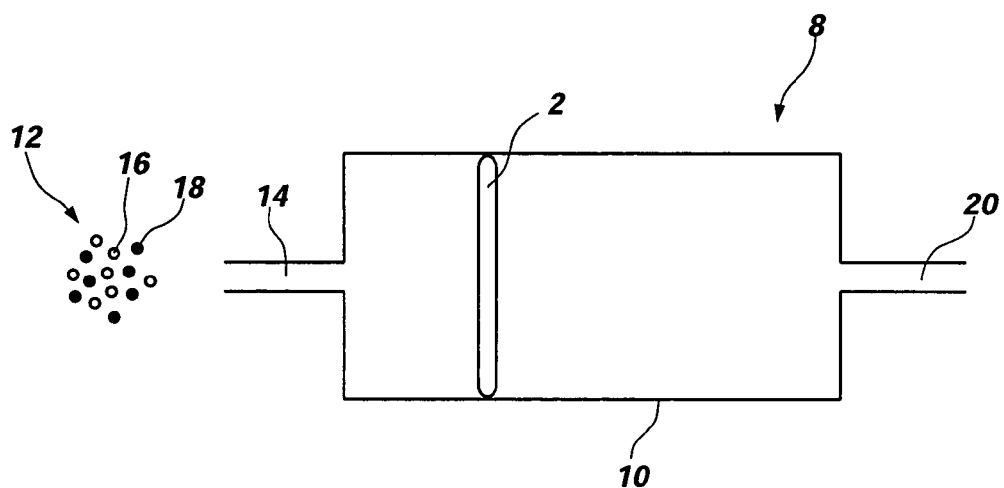
FIGS. 2 and 3 show a membrane separation system utilizing the separation membrane of the present invention.
Figure 3:
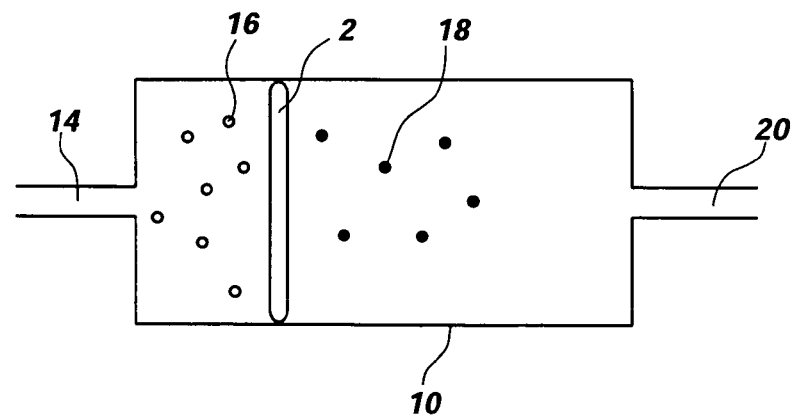

The separation membrane 2 may be used in a membrane separation system 8 that includes a housing 10 that contains the separation membrane 2, as shown in FIG. 2. A comprehensive source of membrane separation systems that may utilize the separation membrane 2 of the present invention are described in *Membrane Separation Systems: Recent Developments and Future Directions*, R. W. Baker, E. L. Cussler, W. Eykamp, W. J. Koros, R. L. Riley, and H. Strathmann, Noyes Data Corporation, Park Ridge, N.J., p. 136–145, 150 (1991). A feedstream 12 including the gas mixture may be flowed through an inlet 14 into the membrane separation system 8. The feedstream 12 may be passed over the separation membrane 2 so that it contacts a surface of the separation membrane 2. The feedstream 12 may include at least one nonpolar gas 16 and at least one polar gas 18. Since the separation membrane 2 has a high permeability and high selectivity for polar gases, the polar gas 18 may permeate and pass through the separation membrane 2 while the nonpolar gas 16 does not pass through the separation membrane 2, as shown in FIG. 3. As such, the polar gas 18 and the nonpolar gas 16 may be selectively separated. The polar gas 18 may be conducted from the membrane separation system 8 through outlet 20. The separated, polar gas 18 may then be used in subsequent processes or may be disposed of. The nonpolar gas 16 may be removed from the housing 10 and may be further proceed or distributed. The nonpolar gas 16 may be maintained at a preseparation temperature and pressure and, therefore, recompression of the nonpolar gas 16 may not be necessary before further processing or distribution. The separation membrane 2 may be used to separate the gases at a temperature ranging from approximately −70° F. to approximately 300° F. In other words, the feedstream 12 may be maintained at a temperature ranging from approximately −70° F. to approximately 300° F. As such, the separation membrane 2 may be more thermally stable than membranes formed from conventional polymeric materials.

The separation membrane 2 may also be used to remove $CO_2$ from $CH_4$ for use in a Fischer-Tropsch synthesis. The Fischer-Tropsch synthesis may be used to convert $CH_4$ to higher molecular weight hydrocarbons by converting the $CH_4$ to synthesis gas, which is a mixture of carbon monoxide and hydrogen. The synthesis gas may be contacted with a Fischer-Tropsch catalyst under conditions of increased temperature and pressure. However, in addition to the desired products, $CH_4$ and $CO_2$ may also be produced. The $CH_4$ may be recycled through a synthesis gas generator but, over time, each recycle may lead to increased levels of $CO_2$. Since the increased $CO_2$ levels may adversely affect the Fischer-Tropsch synthesis, the $CO_2$ may be removed using the separation membrane 2.

Without being tied to a particular theory, it is believed that the effectiveness of the separation membrane 2 is due to the low $T_g$ of the polyphosphazene 4, which is less than approximately −20° C. The low $T_g$ of the polyphosphazene 4 may provide increased performance or permeability of the polar gases 18 without compromising the selectivity of the separation membrane 2. By having a low $T_g$, the polyphosphazene 4 may have increased molecular motions at room temperature, which enables the backbone of the polyphosphazene 4 to be more accessible to the gases in the gas mixture. In other words, the polyphosphazene 4 may be more flexible at the molecular level, providing greater access of the gases to the backbone of the polyphosphazene 4. Since the backbone of the polyphosphazene 4 is polar, the polar gases 18 may dissolve and diffuse through the polyphosphazene 4, providing increased selectivity through the separation membrane 2. As such, it is believed that the low $T_g$ of the polyphosphazene 4, and not the pendant groups attached to the polyphosphazene backbone, may result in the increased permeability and selectivity of the separation membrane 2 to the polar gases, such as $CO_2$ and $H_2S$.

The following examples serve to explain embodiments of the present invention in more detail. These examples are not to be construed as being exhaustive, exclusive or otherwise limiting as to the scope of this invention.

EXAMPLES

Example 1

Synthesis of
Poly[bis-(3-phenyl-1-propoxy)phosphazene]

All chemicals were obtained from Sigma-Aldrich Co. (St. Louis, Mo.) unless otherwise noted. Poly[bis-(3-phenyl-1-propoxy)phosphazene] was synthesized by reacting poly [bis-chlorophosphazene] with sodium 3-phenyl-1-propoxide. Poly[bis-chlorophosphazene] was synthesized by the method of Singler et al., *J. Poly. Sci. Polymer Chem. Ed*, 12:433–444 (1974). Sodium 3-phenyl-1-propoxide was prepared by placing 122.1 g (0.896 mol) of 3-phenyl-1-propanol in an oven-dried, 2-liter, 3-neck round bottom flask. To this flask was added a mechanical stirrer, a thermometer, a condenser, and a nitrogen purge. This apparatus was charged with 300 ml of dry THF, followed by the addition of 26.9 g (0.896 mol) of sodium hydride (80% suspension in mineral oil) incrementally over 20 minutes. Additional THF (50 ml) was added and the resulting mixture was stirred at room temperature under nitrogen for 1.5 hours, forming the sodium 3-phenyl-1-propoxide.

In a separate 300-ml round bottom flask, a solution was prepared using 26.0 g (0.224 mol) of the poly[bis-chlorophosphazene] and 100 ml of dry toluene (azeotropically distilled prior to use). The poly[bis-chlorophosphazene] solution was added to a solution of the sodium 3-phenyl-1-propoxide using 25 ml of dry toluene. 600 ml of dry diglyme was added and the resulting solution was heated to a temperature of 105° C. A Dean-Stark trap was added to the apparatus and sufficient THF was removed from the reaction mixture to attain a constant reflux temperature of 105° C. The mixture was stirred for 16.5 hours until it was determined that the reaction was complete by phosphorus-31 ("P-31") Nuclear Magnetic Resonance ("NMR") spectrometry.

The resulting poly[bis-(3-phenyl-1-propoxy)phosphazene] was purified through initial precipitation of the mother liquor into 3 L of reagent alcohol, where the product material rose to the top of the vessel as a brown swollen mass. The product material was collected and dissolved in 300 ml of THF. Once completely dissolved, the product material was precipitated into 3 L of deionized water and the solid material was collected. An additional precipitation was performed into 3 L of hexane to yield 50.0 g (70% yield) of a tan rubber upon drying under vacuum for three days.

The material was characterized by P-31 NMR, carbon-13 ("C-13") NMR, proton ("H-1") NMR, Differential Scanning Calorimetry (DSC), and Thermogravimetric Analysis (TGA). P-31 NMR: (σ, ppm) −6.5. C-13 NMR: (σ, ppm) 33.0, 33.1, 65.9, 126.5, 129.10, 129.14, 142.5. H-1 NMR: (σ, ppm) 1.82, 2.58, 4.01, 6.99, 7.10. Differential Scanning Calorimetry (DSC) $T_g$ −45.9° C. Thermogravimetric Analysis (TGA) $T_d$ 315° C.

Example 2

Synthesis of
Poly[bis-(2-phenyl-1-ethoxy)phosphazene]

In a 2-liter, 3-neck round bottom flask equipped with a mechanical stirrer, thermometer, nitrogen purge, and condenser was added 77.8 g (0.637 mol) phenethyl alcohol and 500 ml dry THF. To this solution, 19.1 g, (0.637 mol) sodium hydride was added over 30 minutes. The resulting mixture was stirred under nitrogen for 1.5 hours. To this solution was added a solution of 28.4 g (0.245 mol) poly[bis-chlorophosphazene], prepared as described in Example 1, in 100 ml dry toluene. Additional dry THF (200 ml) was added and mild heating gave a steady reflux at 45° C. The solution was stirred for 8.5 hours upon which the reaction was determined to be complete by P-31 NMR spectrometry.

Purification of the poly[bis-(2-phenyl-1-ethoxy)phosphazene] was accomplished through successive precipitations from THF into 3 L of reagent alcohol, 4 L of water, and 3 L of hexane. Drying under vacuum afforded 49.7 g of a tan rubber, giving a 71% yield.

The material was characterized by P-31 NMR, carbon-13 ("C-13") NMR, proton ("H-1") NMR, Differential Scanning Calorimetry (DSC), and Thermogravimetric Analysis (TGA). P-31 NMR (σ, ppm) −6.9. C-13 (σ, ppm) 37.5, 67.0, 126.9, 129.0, 129.8, 139.2. H-1 NMR (τ, ppm) 2.68, 3.98, 6.99, 7.08. DSC $T_g$ −35.6° C. TGA $T_d$ 276° C.

Example 3

Synthesis of
Poly[bis-(dodecanoxypolyethoxy)phosphazene]

Poly[bis-(dodecanoxypolyethoxy)phosphazene] was synthesized by reacting Brij® 30 with poly[bis-chlorophosphazene]. The Brij® 30 used in the reaction was a commercial formulation having an average structure of $C_{12}H_{25}$ $(OCH_2CH_2)_{4.89}H)$ as determined by $^1H$ NMR spectroscopy. Brij® 30 is available from Uniqema (Gouda, The Netherlands). In a one-liter, three neck round bottom flask equipped with a mechanical stirrer, thermometer, a condenser, and a nitrogen gas purge, 159.9 g of Brij-30®, 9.1 g freshly cut sodium metal, and 500 ml of anhydrous THF was added. The mixture was heated to reflux under nitrogen and 300 ml of dry toluene was added. A Dean-Stark trap was attached to the apparatus to remove the lower boiling THF until a constant boiling temperature of 100° C. was reached. The mixture was heated for approximately 48 hours, until the sodium was consumed. Then, 24.0 g of poly[bis-chlorophosphazene] in 100 ml of dry toluene was added and the solution was stirred at temperature for one hour. The heat was then removed and the solution was cooled for an additional hour.

The polymer was purified by pouring the mother liquor into 2.5 L of 80% aqueous reagent alcohol. The polymer was collected as a white swollen mass and was dissolved in 400 ml of THF. Once dissolved, the solution was poured into 2.5 L of water. The polymer was then collected and re-dissolved in 400 ml of THF prior to final precipitation into 1 L of reagent alcohol. The polymer was then collected and dried under vacuum to yield 34.6 g of an amber rubber in 44% yield.

The material was characterized using P-31 NMR and DSC. Laser Light Scattering was used to determine the molecular weight. P-31 ($\sigma$, ppm) −7.3. $T_g$ −51.3° C. Molecular weight ($M_w$) 2,500,000 g/mol.

Example 4

Synthesis of Poly[bis-(2-(2-(2-ω-undecylenyloxyethoxy)ethoxy)ethoxy)phosphazene]

The pendant group, 2-(2-(2-ω-undecylenyloxyethoxy)ethoxy)ethanol, was synthesized by coupling between ω-undecylenyl alcohol and triethylene glycol. To prepare the undecylenyl portion of the pendant group, the alcohol functionality of the ω-undecylenyl alcohol was converted to a tosylate using p-toluenesulfonyl chloride. In a one liter three-neck round bottom flask equipped with a magnetic stirrer was added 46.9 g ω-undecylenyl alcohol, 44.5 ml pyridine, and 300 ml methylene chloride. The reaction vessel was then purged with dry nitrogen and the temperature was reduced to 0° C. using an ice bath. The reaction vessel was then equipped with a 250 ml pressure equalizing addition funnel and a solution of 52.4 g of p-toluenesulfonyl chloride in 200 ml of methylene chloride was added. The p-toluenesulfonyl chloride solution was added to the reaction solution over 2 hours. The ice bath was then removed and the solution was stirred for 15 hours. A large amount of precipitate (pyridine hydrochloride) was observed, indicating the completion of the reaction. The entire contents of the reaction flask were transferred to a two liter separatory funnel and the solution was washed with the following: twice with 400 ml portions of 2 M aqueous HCl, twice with deionized water (400 ml), and once each with saturated sodium bicarbonate (400 ml), saturated sodium citrate (400 ml), and saturated sodium chloride. The remaining organic phase was then stripped of the solvent using a rotary evaporator to yield 70.5 g of ω-undecylenyl tosylate in 80% yield.

The ω-undecylenyl portion of the pendant group was attached to the triethlylene glycol through the reaction of a monosodium salt of triethylene glycol with the ω-undecylenyl tosylate. In an oven-dried, two liter three-neck round bottom flask was added a magnetic stirbar, a condenser, and nitrogen purge. To this flask was added 408 g of triethylene glycol and 500 ml of anhydrous THF. Then, 6.54 g of sodium hydride was added slowly, forming a suspension. The reaction flask was then brought to reflux at approximately 60° C. and stirred for three hours, upon which the solution clarified and appeared amber in color. A pressure equalizing addition funnel charged with 70.5 g of ω-undecylenyl tosylate in 150 ml of anhydrous THF was added to the reaction vessel and the contents were added dropwise over 1.5 hours. The reaction mixture was heated at reflux for 15 hours upon which the heat was removed and the vessel was allowed to cool to room temperature. Once cool, the reaction was filtered to remove precipitated sodium tosylate. The filtrate was then transferred to a two-liter separatory funnel and 500 ml of deionized water and 500 ml of methylene chloride were added. The organic phase was retained and washed with successive portions of 500 ml of deionized water, 500 ml of saturated sodium citrate, and 500 ml of saturated sodium chloride. After the final extraction, the organic phase was dried using 15 g of anhydrous magnesium sulfate followed by filtration. The solvent was removed by rotary evaporation to yield 55.3 g of golden oil, crude 2-(2-(2-ω-undecylenyloxyethoxy)ethoxy)ethanol. The crude 2-(2-(2-ω-undecylenyloxyethoxy)-ethoxy)ethanol was purified using a silica gel column (230–400 mesh) and 70% hexane/30% ethyl acetate as the elution solvent to give a final purified yield of 46.2 g (70%).

The pendant group, 2-(2-(2-ω-undecylenyloxyethoxy)ethoxy)ethanol, was characterized using H-1 NMR ($\sigma$, ppm) 5.73 (m, 1H), 4.91 (dd, 1H), 4.84 (dd, 1H), 3.58 (overlapping multiplet, 12H), 3.38 (dd, 1H), 3.37 (dd, 1H), 2.97 (brs, 1H), 1.97 (overlapping multiplet, 2H), 1.51 (overlapping multiplet, 2H), 1.18 (overlapping multiplet, 12H).

Poly[bis-(2-(2-(2-ω-undecylenyloxyethoxy)ethoxy)ethoxy)phosphazene] was synthesized by reacting the sodium salt of 2-(2-(2-ω-undecylenyloxyethoxy)ethoxy)ethanol with poly[bis-chlorophosphazene]. In a one-liter three neck round bottom flask equipped with a mechanical stirrer, thermometer, a condenser, and a nitrogen gas purge, was added 20.0 g of 2-(2-(2-ω-undecylenyloxyethoxy)ethoxy)ethanol, 2.6 g of freshly cut sodium metal, and 500 ml of anhydrous 1,4-dioxane. The mixture was heated to reflux (93° C.) under nitrogen. The mixture was heated for approximately 48 hours, until the sodium was consumed. Then, 3.4 g of poly[bis-chlorophosphazene] in 100 ml of dry toluene was added and the solution was stirred at temperature for one hour. The heat was then removed and the solution was allowed to cool for an additional hour. The polymer was purified by pouring the mother liquor into 2.5 L of 80% aqueous reagent alcohol. The polymer was collected as a white swollen mass and was dissolved in 400 ml of THF. Once dissolved, the solution was poured into 2.5 L of water. The polymer was then collected and re-dissolved in 400 ml of THF prior to final precipitation into 1 L of reagent alcohol. The polymer was then collected and dried under vacuum to yield 10.5 g of an amber rubber in 68% yield.

The polymer was characterized using P-31 and H-1 NMR spectroscopy and DSC. P-31 ($\sigma$, ppm) −7.2. $^1$H ($\sigma$, ppm) 5.82 (m, 1H), 4.99 (dd, 1H), 4.93 (dd, 1H), 4.02 (brs, 2H), 3.61 (brs, 10 H), 3.43 (brs, 2H), 2.04 (dd, 2H), 1.57 (brs, 2H), 1.29 (brs, 12H). DSC $T_m$ −22° C.

Example 5

Separation Membrane Including a Coating of Poly[bis-(3-phenyl-1-propoxy)phosphazene]

A separation membrane having a coating of poly[bis-(3-phenyl-1-propoxy)phosphazene] was prepared. The poly[bis-(3-phenyl-1-propoxy)phosphazene] was synthesized as described in Example 1. A solution of poly[bis-(3-phenyl-1-propoxy)phosphazene] was formed by dissolving 10% by weight of poly[bis-(3-phenyl-1-propoxy)phosphazene] in THF in a closed jar under ambient conditions. Once dissolved, the solution was centrifuged to remove any suspended particulate material. The separation membrane was formed by coating a 25 mm diameter, Whatman Anodisk® porous ceramic substrate with approximately 1 ml of the solution. The solution was applied using a Pasteur pipet. The separation membrane was then covered with a glass vessel, such as a beaker or a crystallizing dish, to slow the evaporation of the solvent. If the solvent was allowed to evaporate too quickly, bubbles formed in the separation membrane, leading to surface defects or holes. After approximately two to five hours, once the separation membrane had dried, the separation membrane was placed in an oven at 80° C. for 12 hours to assure complete removal of the solvent. The separation membrane was then mounted into a cell housing for use. The thickness of the poly[bis-(3-phenyl-1-propoxy)phosphazene] separation membranes formed using this method ranged from 60 µm to 105 µm in thickness. Thicknesses were determined by direct measurement using a Mitutoyo caliper.

Example 6

Separation Membrane Including a Coating of Poly[bis-(2-phenyl-1-ethoxy)phosphazene]

A separation membrane having a coating of poly[bis-(2-phenyl-1-ethoxy)phosphazene] was prepared. The poly[bis-(2-phenyl-1-ethoxy)phosphazene] was synthesized as described in Example 2. A solution of the poly[bis-(3-phenyl-1-propoxy)phosphazene] was formed by dissolving 5% by weight of the poly[bis-(3-phenyl-1-propoxy)phosphazene] in THF in a closed jar under ambient conditions. Once dissolved, the solution was centrifuged to remove any suspended particulate material. The separation membrane was formed by coating a 25 mm diameter, Whatman Anodisk® porous ceramic substrate with approximately 1 ml of the solution. The solution was applied using a Pasteur pipet. The separation membrane was then covered with a glass vessel, such as a beaker or a crystallizing dish, to slow the evaporation of the solvent. If the solvent was allowed to evaporate too quickly, bubbles formed in the separation membrane, leading to surface defects or holes. After approximately two to five hours, once the separation membrane had dried, the separation membrane was placed in an oven at 80° C. for 12 hours to assure complete removal of the solvent. The separation membrane was then mounted into a cell housing for use. The thickness of the poly[bis-(2-phenyl-1-ethoxy)phosphazene] separation membranes formed using this method ranged from 55 µm to 83 µm in thickness. Thicknesses were determined by direct measurement using a Mitutoyo caliper.

Example 7

Separation Membrane Including a Coating of Poly[bis-(dodecanoxypolyethoxy)phosphazene]

A separation membrane having a coating of poly[bis-(dodecanoxypolyethoxy)-phosphazene] was prepared. The poly[bis-(dodecanoxypolyethoxy)phosphazene] was synthesized as described in Example 3. A solution of the poly[bis-(dodecanoxypolyethoxy)phosphazene] was formed by dissolving 1% by weight of the poly[bis-(dodecanoxypolyethoxy)phosphazene] in THF in a closed jar under ambient conditions. Once dissolved, the solution was centrifuged to remove any suspended particulate material. The separation membrane was formed by coating a 25 mm diameter, Whatman Anodisk® porous ceramic substrate sequentially using approximately 1 ml of the solution four times. Complete drying between coatings was not necessary. The solution was applied using a Pasteur pipet. After the final coating, the separation membrane was covered with a glass vessel, such as a beaker or a crystallizing dish, to slow the evaporation of the solvent. If the solvent was allowed to evaporate too quickly, bubbles formed in the separation membrane, leading to surface defects or holes. After approximately two to five hours, once the separation membrane had dried, the separation membrane was placed in an oven at 80° C. for 12 hours to assure complete removal of the solvent. The separation membrane was then mounted into a cell housing for use. The thickness of the poly[bis-(dodecanoxypolyethoxy)phosphazene] separation membranes formed using this method ranged from 50 µm to 69 µm in thickness. Thicknesses were determined using membrane diameter, polymer mass, and polymer density calculations, as known in the art.

Example 8

Separation Membrane Including a Coating of Poly[bis-(2-(2-(2-ω-undecylenyloxyethoxy)ethoxy)ethoxy)phosphazene]

A separation membrane having a coating of poly[bis-(2-(2-(2-ω-undecylenyloxyethoxy)ethoxy)ethoxy)phosphazene] was prepared. The poly[bis-(2-(2-(2-ω-undecylenyloxyethoxy)ethoxy)ethoxy)phosphazene] was synthesized as described in Example 4. A solution of the poly[bis-(2-(2-(2-ω-undecylenyloxyethoxy)ethoxy)ethoxy)phosphazene] was formed by dissolving 5% by weight of the poly[bis-(2-(2-(2-ω-undecylenyloxyethoxy)ethoxy)ethoxy)-phosphazene] in THF in a closed jar under ambient conditions. Once dissolved, the solution was centrifuged to remove any suspended particulate material. The separation membrane was formed by coating a 25 mm diameter, Whatman Anodisk® porous ceramic substrate with approximately 1 ml of the solution. The solution was applied using a Pasteur pipet. The separation membrane was then covered with a glass vessel, such as a beaker or a crystallizing dish, to slow the evaporation of the solvent. If the solvent was allowed to evaporate too quickly, bubbles formed in the separation membrane, leading to surface defects or holes. After approximately two to five hours, once the separation membrane had dried, the separation membrane was placed in an oven at 80° C. for 12 hours to assure complete removal of the solvent. The separation membrane was then mounted into a cell housing for use. The thickness of the poly[bis-(2-(2-(2-ω-undecylenyloxyethoxy)ethoxy)-ethoxy)phosphazene] separation membranes formed using this method ranged from 50 µm to 69 µm in thickness. Thicknesses were determined using membrane diameter, polymer mass, and polymer density calculations, as known in the art.

Example 9

Permeability and Selectivity of the Polyphosphazene Separation Membranes

Pure gas permeability testing of an analyte gas mixture that included $N_2$, $O_2$, $CH_4$, $CO_2$, and $H_2S$ was performed on the separation membranes described in Examples 1–4. For comparative purposes, separation membranes coated with halogenated polyphosphazenes (poly[bis-(4-fluorophenoxy)phosphazene], poly[bis-(2,2,2-trifluoroethoxy) phosphazene], and Eypel-F) were also prepared. Eypel-F is a fluorinated alkoxyphosphazene that was obtained from Ethyl Corp. (Richmond, Va.). The two other halogenated polyphosphazenes were prepared as known in the art. The permeabilities were determined as known in the art at 30° C., where the permeate volume was 1021.5 ml, the membrane area was 3.2 cm², and the initial feed gas pressure was 30 psi. The permeabilities for the polyphosphazenes of the present invention and the halogenated polyphosphazenes are shown in Table 1.

TABLE 1

Gas permeability (Barrers) of the Polyphosphazenes.

| Polyphosphazene | $T_g$ (° C.) | $H_2$ | Ar | $N_2$ | $O_2$ | $CH_4$ | $CO_2$ | $H_2S$ |
|---|---|---|---|---|---|---|---|---|
| Poly[bis-(phenoxy)phosphazene] | −3 | 7.5 | 2.3 | 1.3 | 2.1 | 1.2 | 4.8 | 12.4 |
| Poly[bis-(2-phenyl-1-ethoxy)phosphazene] | −36 | 47 | 12 | 7 | 24 | 21 | 175 | 750 |
| Poly[bis-(3-phenyl-1-propoxy)phosphazene] | −46 | 23.0 | 12.0 | 6.0 | 15.0 | 17.0 | 107.0 | 511.0 |
| Poly[bis-(dodecanoxypolyethoxy)phosphazene] | −45 | 62.1 | 44.1 | 21.0 | 46.2 | 67.3 | 386.4 | — |
| Poly[bis-(2-(2-(2-ω-undecylenyloxyethoxy)ethoxy)ethoxy)phosphazene] | −22 ($T_m$) | 142.2 | 113.1 | 58.6 | 132.9 | 163.4 | 844.8 | — |
| Poly[bis-(4-fluorophenoxy)phosphazene] | 5 | 5.5 | 1.0 | 0.4 | 0.4 | 0.9 | 9.5 | 21.6 |
| Poly[bis-(2,2,2-trifluoroethoxy)phosphazene] | −60 | 130 | 68.0 | 39.0 | 81.0 | 47.0 | 420.0 | 374.0 |
| Eypel-F | −59 | 80.0 | 37.0 | 22.0 | 65.0 | 41.0 | 376.0 | 316.0 |

Ideal separation factors for the polyphosphazenes are shown in Table 2. Although the ideal separation factors are not a measurement of actual gas separation, they provide an indicator of expected selectivity performance. The ideal separation factors were calculated as known in the art.

TABLE 2

Ideal Separation Factors (α) of the Polyphosphazenes.

| Polyphosphazene | $CO_2/N_2$ | $CO_2/H_2$ | $CO_2/CH_4$ | $H_2S/N_2$ | $H_2S/H_2$ | $H_2S/CH_4$ |
|---|---|---|---|---|---|---|
| Poly[bis-(phenoxy)phosphazene] | 3.7 | 0.64 | 4.0 | 9.5 | 1.7 | 10.3 |
| Poly[bis-(2-phenyl-1-ethoxy)phosphazene] | 25.0 | 3.7 | 8.3 | 107 | 16 | 35.7 |
| Poly[bis-(3-phenyl-1-propoxy)phosphazene] | 17.8 | 4.7 | 6.3 | 85.2 | 22.2 | 30.1 |
| Poly[bis-(dodecanoxypolyethoxy)phosphazene] | 18.4 | 6.2 | 5.7 | — | — | — |
| Poly[bis-(2-(2-(2-ω-undecylenyloxyethoxy)ethoxy)ethoxy)phosphazene] | 14.4 | 5.9 | 5.2 | — | — | — |
| Poly[bis-(4-fluorophenoxy)phosphazene] | 23.8 | 1.7 | 10.6 | 54.0 | 3.9 | 24.0 |
| Poly[bis-(2,2,2-trifluoroethoxy)phosphazene] | 10.8 | 3.2 | 8.9 | 9.6 | 2.9 | 8.0 |
| Eypel-F | 17.1 | 4.7 | 9.2 | 14.4 | 4.0 | 7.7 |

As shown by the data in Tables 1 and 2, the polyphosphazenes of the present invention have good permeabilities and good selectivities for separating the polar gases from the nonpolar gases. While some of the halogenated polyphosphazenes also showed good permeabilities, the selectivities of the halogenated polyphosphazenes were, on average, lower than the selectivities of the polyphosphazenes of the present invention. In particular, the polyphosphazenes of the present invention exhibited high permeabilities and high selectivities for $CO_2$ and $H_2S$ relative to the nonpolar gases in the gas mixture. A comparison of the permeabilities and selectivities of poly[bis-(3-phenyl-1-propoxy)phosphazene], poly[bis-(2,2,2-trifluoroethoxy)phosphazene], and Eypel-F, which have similar $T_g$'s, showed that the poly[bis-(3-phenyl-1-propoxy)phosphazene] had higher permeabilities and higher selectivities than the halogenated polyphosphazenes.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of separating a gas from a gas mixture, comprising:
   contacting a separation membrane with a gas mixture comprising at least one polar gas and at least one nonpolar gas, the separation membrane comprising a polyphosphazene coating in contact with a support, wherein the polyphosphazene coating comprises a polyphosphazene having a glass transition temperature ("$T_g$") of approximately −20° C. or less and wherein the polyphosphazene has no halogen atoms and no aromatic groups attached to an oxygen atom that is bound to a phosphorus atom of a backbone of the polyphosphazene and
   allowing at least a portion of the at least one polar gas to permeate and pass through the separation membrane whereby at least a portion of the at least one polar gas is separated from the at least one nonpolar gas of the gas mixture.

2. The method of claim 1, wherein contacting the separation membrane with a gas mixture comprising at least one polar gas and at least one nonpolar gas comprises contacting the separation membrane with a gas mixture comprising at least one gas selected from the group consisting of hydrogen, helium, oxygen, nitrogen, argon, carbon monoxide, carbon dioxide, water vapor, ammonia, hydrogen sulfide, nitrogen oxides, sulfur oxides, and light hydrocarbons.

3. The method of claim 1, wherein contacting the separation membrane with a gas mixture comprising at least one polar gas and at least one nonpolar gas comprises contacting the separation membrane with a gas mixture comprising carbon dioxide, hydrogen sulfide, and methane.

4. The method of claim 1, wherein contacting the separation membrane with a gas mixture comprising at least one polar gas and at least one nonpolar gas comprises contacting the separation membrane with a gas mixture maintained at a temperature ranging from approximately 70° F. to approximately 300° F.

5. The method of claim 1, wherein contacting the separation membrane with a gas mixture comprising at least one polar gas and at least one nonpolar gas comprises contacting the separation membrane comprising a polyphosphazene coating having a $T_g$ ranging from approximately −100° C. to approximately −20° C. with the gas mixture.

6. The method of claim 1, wherein contacting the separation membrane with a gas mixture comprising at least one polar gas and at least one nonpolar gas comprises contacting the separation membrane comprising a polyphosphazene selected from the group consisting of poly[bis-3-phenyl-1-propoxy)phosphazene], poly[bis-(2-phenyl-1-ethoxy)phosphazene], poly[bis-(dodecanoxypolyethoxy)phosphazene], and poly[bis-(2-(2-(2-ω-undecylenyloxyethoxy)ethoxy)ethoxy)phosphazene] with the gas mixture.

7. The method of claim 1, wherein allowing at least a portion of the at least one polar gas to permeate and pass through the separation membrane whereby at least a portion of the at least one polar gas is separated from the at least one nonpolar gas of the gas mixture comprises allowing at least a portion of at least one of carbon dioxide or hydrogen sulfide to permeate and pass through the separation membrane whereby the at least a portion of the at least one of carbon dioxide or hydrogen sulfide is separated from the gas mixture.

8. A membrane separation system comprising a housing that contains a separation membrane, the separation membrane comprising a support and a polyphosphazene coating in contact with the support, wherein the polyphosphazene coating comprises a polyphosphazene having a glass transition temperature ("$T_g$") of approximately −20° C. or less and wherein the polyphosphazene has no halogen atoms and no aromatic groups attached to an oxygen atom that is bound to a phosphorus atom of a backbone of the polyphosphazene.

9. The membrane separation system of claim 8, wherein the $T_g$ of the polyphosphazene ranges from approximately −100° C. to approximately −20° C.

10. The membrane separation system of claim 8, wherein the polyphosphazene is selected from the group consisting of poly[bis-3-phenyl-1-propoxy)phosphazene], poly[bis-(2-phenyl-1-ethoxy)phosphazene], poly[bis-(dodecanoxypolyethoxy)phosphazene], and poly[bis-(2-(2-(2-ω-undecylenyloxyethoxy)ethoxy)ethoxy)phosphazene].

11. A separation membrane comprising a support and a polyphosphazene coating in contact with the support, the polyphosphazene coating comprising a polyphosphazene having a glass transition temperature ("$T_g$") of approximately −20° C. or less, wherein the polyphosphazene has no halogen atoms and wherein no aromatic groups are attached to an oxygen atom that is bound to a phosphorus atom of a backbone of the polyphosphazene.

12. The separation membrane of claim 11, wherein the $T_g$ of the polyphosphazene ranges from approximately −100° C. to approximately −20° C.

13. The separation membrane of claim 11, wherein the polyphosphazene is selected from the group consisting of poly[bis-3-phenyl-1-propoxy)phosphazene], poly[bis-(2-phenyl-1-ethoxy)phosphazene], poly[bis-(dodecanoxypolyethoxy)phosphazene], and poly[bis-(2-(2-(2-ω-undecylenyloxyethoxy)ethoxy)ethoxy)phosphazene].

14. The separation membrane of claim 11, wherein the support comprises a material selected from the group consisting of cellulose, cellulose acetate, a polyamide, a polyacrylonitrile, a polysulfone, a polyethersulfone, an aromatic polyimide, a polycarbonate, a polyestercarbonate, a polyester, a polyetherketone, a polyolefin, a polytetrafluoroethylene, a polyvinylidenefluoride, a polybenzoazole, and a ceramic material.

15. The separation membrane of claim 11, wherein a thickness of the polyphosphazene coating ranges from approximately 50 μm to approximately 200 μm.

16. A polyphosphazene having a glass transition temperature ("$T_g$") of approximately −20° C. or less and having at least one pendant group attached to a backbone of the polyphosphazene, wherein the at least one pendant group has no halogen atoms and wherein no aromatic groups are attached to an oxygen atom that is bound to a phosphorus atom of the backbone of the polyphosphazene.

17. The polyphosphazene of claim 16, wherein the polyphosphazene has the structure

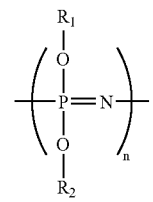

and wherein $R_1$ and $R_2$ are independently selected from an alkyl group, a branched alkyl group, an aromatic-substituted alkyl group, and an alkyl-substituted polyether and n is an integer ranging from approximately 100 to approximately 70,000.

18. The polyphosphazene of claim 16, wherein the $T_g$ of the polyphosphazene ranges from approximately −100° C. to approximately −20° C.

19. The polyphosphazene of claim 16, wherein the polyphosphazene is selected from the group consisting of poly[bis-3-phenyl-1-propoxy)phosphazene], poly[bis-(2-phenyl-1-ethoxy)phosphazene], poly[bis-(dodecanoxypolyethoxy)phosphazene], and poly[bis-(2-(2-(2-ω-undecylenyloxyethoxy)ethoxy)ethoxy)phosphazene].

* * * * *